United States Patent [19]

Harada

[11] Patent Number: 5,317,423
[45] Date of Patent: May 31, 1994

[54] IMAGE SENSING APPARATUS USING CALIBRATION SEQUENCES STORED IN EXTENDED PORTIONS OF SHIFT REGISTERS

[75] Inventor: Hisashi Harada, Tokyo, Japan

[73] Assignee: NEC Corporation, Japan

[21] Appl. No.: 998,384

[22] Filed: Dec. 30, 1992

[30] Foreign Application Priority Data

Dec. 30, 1991 [JP] Japan ................... 3-360351

[51] Int. Cl.⁵ .............................................. H04N 1/04
[52] U.S. Cl. ................... 358/482; 358/483; 358/461; 358/464; 348/243
[58] Field of Search ............ 358/408, 474, 482, 483, 358/494, 213.13, 213.26, 213.29, 213.15, 461, 464; 382/50

[56] References Cited

U.S. PATENT DOCUMENTS

| | | | |
|---|---|---|---|
| 4,216,503 | 8/1980 | Wiggins | 358/483 |
| 4,665,440 | 5/1987 | Tromborg | 358/483 |
| 4,712,137 | 12/1987 | Kadekodi et al. | 358/213.29 |
| 5,025,318 | 6/1991 | Nagura | 358/213.15 |
| 5,204,761 | 4/1993 | Gusmano | 358/461 |

FOREIGN PATENT DOCUMENTS 0473966 8/1991 European Pat. Off. .
2156628 3/1985 United Kingdom .

OTHER PUBLICATIONS

*Patent Abstracts of Japan,* vol. 14, No. 105 (E-0895), JP-A-1305672 (NEC Corp.), Dec. 8, 1989.
*Patent Abstracts of Japan,* vol. 6, No. 176 (E-130)(1054), Sep. 10, 1982, JP-A-57092971 (Matsushita Densou Kiki K.K.) Jun. 9, 1982.

*Primary Examiner*—Edward L. Coles, Sr.
*Assistant Examiner*—Kimberly A. Williams
*Attorney, Agent, or Firm*—Ostrolenk, Faber, Gerb & Soffen

[57] ABSTRACT

In an image sensing apparatus comprising an array of image sensing elements, first and second shift registers are provided, each having stages divided into first and second sections, the stages of the first section of the first and second shift registers corresponding to odd-numbered elements and even-numbered numbered elements of the array, respectively. During each line scan, a transfer command pulse is generated to turn on gates to transfer image signals developed in the array to the corresponding stages of the first shift register of each shift register. A calibration sequence is stored into the second section of each shift register when the gates are in a turn-off state, and the shift registers are alternately driven to deliver the image signals followed immediately by the calibration sequences. The image signals delivered from the shift registers are combined to produce a complete video line signal. A difference in amplitude between the calibration sequences delivered respectively from the shift registers is detected for controlling amplitudes of subsequently delivered image signals.

6 Claims, 4 Drawing Sheets

IMAGE SENSING APPARATUS USING CALIBRATION SEQUENCES STORED IN EXTENDED PORTIONS OF SHIFT REGISTERS

RELATED PATENT

The present invention is related to U.S. Pat. No. 5,025,318, "Imaging Apparatus with Means for Cancelling Differential Offset Voltage", issued to R. Nagura, Jun. 18, 1991, and assigned to the same assignee as the present invention.

BACKGROUND OF THE INVENTION

1. Field of the Invention

The present invention relates generally to image sensing apparatus, and more specifically to a technique for cancelling an amplitude difference between signals shifted along respective shift registers of an image sensor. The present invention is useful for application to facsimile machines and earth observation satellites.

2. Description of the Related Art

Multi-element image sensing apparatus used in applications such as facsimile and earth surveillance include a calibration system for periodically checking the functions of the apparatus in addition to circuitry for sensing images. In these applications, a video signal is generated when the object of interest has a sufficient level of luminance for viewing, and a calibration is performed at other times. More specifically, the image sensing apparatus comprises a linear array of image sensing elements and two shift registers one of which is connected to the odd-numbered elements of the array and the other is connected to the even-numbered elements of the array. Due to manufacturing tolerances, the operating characteristics of the shift registers are not necessary the same. During low luminance periods, a calibration pulse sequence of known amplitude is shifted along the shift registers and the sequences delivered from the shift registers are matched against each other to detect an amplitude difference. In response to the amplitude difference, calibration is effected on the image signals subsequently output from the shift registers.

Since image sensing and calibration are effected during different periods of time, however, the operating characteristics of the shift registers at the time of calibration may differ from those of the shift registers during image sensing due to constantly varying environmental conditions such as temperature and humidity. Therefore, the result of a calibration provided at one time is not ideal for an error that occurs at another time.

SUMMARY OF THE INVENTION

It is therefore an object of the present invention to provide an image sensing apparatus that enables calibration at all times.

According to the present invention, there is provided an image sensing apparatus which comprises an array of image sensing elements, a first shift register having a plurality of stages divided into first and second sections, the stages of the first section corresponding respectively to odd-numbered elements of the array, and a second shift register having a plurality of stages divided into first and second sections, the stages of the first section corresponding respectively to even-numbered elements of the array. In response to a transfer command pulse which is generated during each line scan interval, gates are turned on and image signals developed in the odd-numbered elements of the array are transferred to the corresponding stages of the first shift register and image signals developed in the even-numbered elements of the array are transferred to the corresponding stages of the second shift register. A calibration sequence is generated and stored into the second section of each shift register when the gates are in a turn-off state, and the first and second shift registers are alternately driven to deliver the image signals and the calibration sequences therefrom. The image signals delivered from the first and second shift registers are combined to produce a complete video line signal. The difference in amplitude between the calibration sequences delivered from the first and second shift registers is detected, and the amplitude of the delivered image signals is controlled in response to the detected difference.

BRIEF DESCRIPTION OF THE DRAWINGS

The present invention will be described in further detail with reference to the accompanying drawings, in which.

DETAILED DESCRIPTION

Figure 1A:
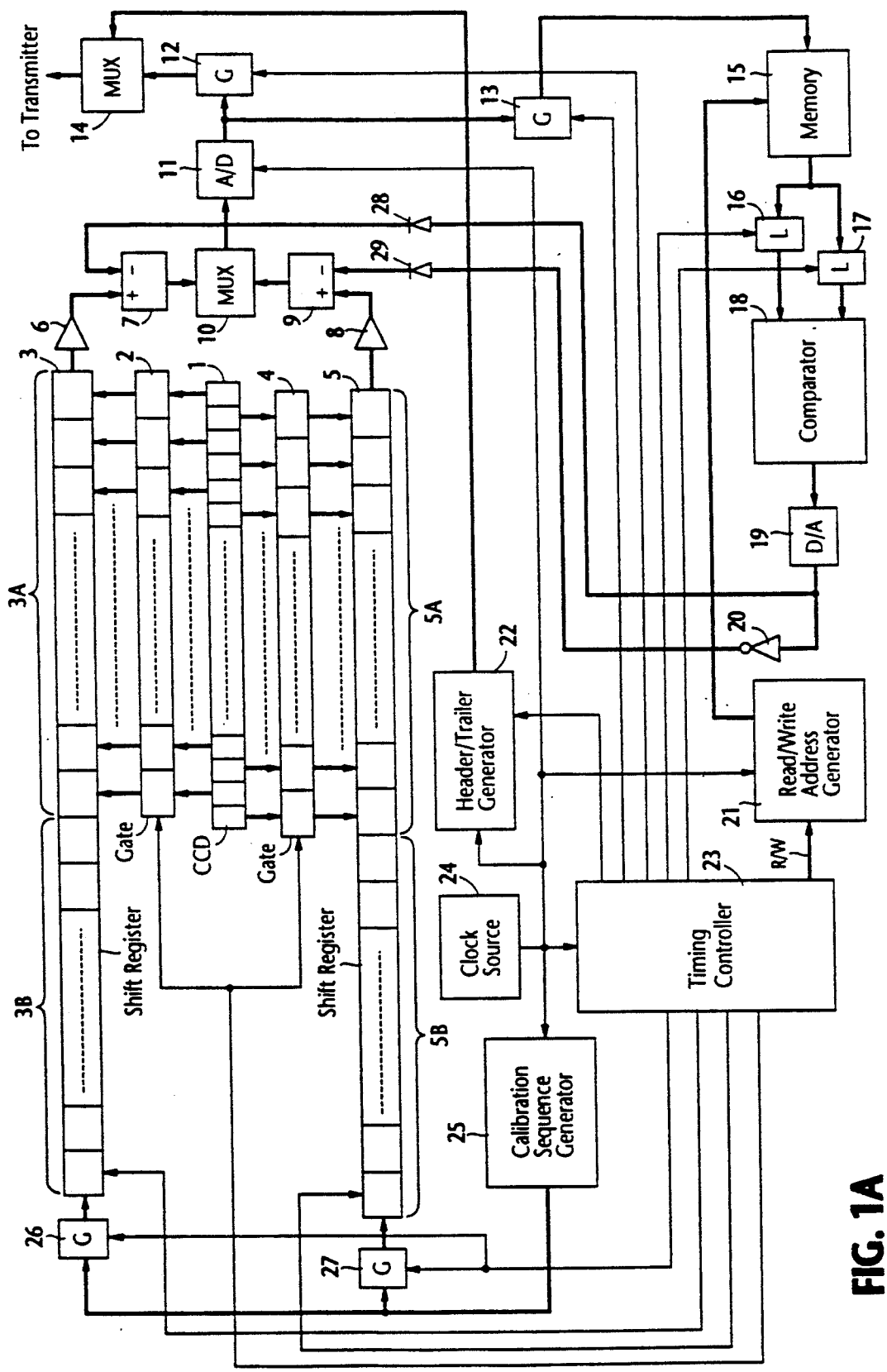
FIG. 1A is a block diagram of an image transmission system according to one embodiment of the present invention.

Referring now to FIG. 1A, there is an image sensor for use in an earth observation satellite according to one embodiment of the present invention. The image sensor comprises a shift register 3 which is divided equally into a forward section 3A and a backward section 3B, and a shift register 5 which is likewise divided into a forward section 5A and a backward section 5B. A charge-coupled device 1 is provided having a linear array of 4,096 elements. The odd-numbered elements of the CCD are coupled via a transfer gate 2 to the forward section 3A of shift register 3, and the even-numbered elements of the CCD are coupled via a transfer gate 4 to the forward section 5A of shift register 5. The output end of shift register 3 is connected through an amplifier 6 to one input of a subtractor 7, and the output end of shift register 5 is connected through an amplifier 8 to one input of a subtractor 9. The outputs of subtractors 7 and 9 are combined by a multiplexer 10 and applied to an analog-to-digital converter 11. The output of A/D converter 11 is connected to gates 12 and 13.

As will be described, the output of gate 12 is a digital video signal which is applied to a multiplexer 14 where it is multiplexed with a header and a trailer from a header/trailer generator 22 to produce a frame sequence for coupling to a transmitter, not shown, for where the signal is modulated upon a down-link carrier and transmitted toward an earth station. On the other hand, the output of gate 13 is a digital calibration sequence which is written into a read/write memory 15 in a location specified by a write address signal supplied from a read/write address generator 21. The stored calibration sequence is read out of memory 15 into one of latches 16 and 17 in response to a read address signal from the address generator 21. The outputs of latches 16 and 17 are connected to a digital comparator 18 where a difference is detected between the calibration sequences which have been shifted along shift registers 3 and 5, respectively. The difference value is converted into analog form by a digital-to-analog converter 19 and supplied to the subtractor 7 via a diode 28. An inverter 20 is connected to the output of D/A converter 19 to supply an inverted D/A converter output via a diode 29 to the subtractor 9.

A timing controller 23 is connected to a clock source 24 to supply various timing signals to gates 2, 4, 12, 13, header/trailer generator 22, latches 16, 17 and address generator 21.

A calibration sequence generator 25 is responsive to the clock pulse from clock source 24 for generating a sequence of pulses of prescribed amplitude. The calibration sequence is applied through gates 26 and 27 to the input ends of shift registers 3 and 5 when the gates 26, 27 are enabled by a control pulse from the timing controller 23. The calibration sequence is shifted along the respective shift registers when they are driven at a high clock rate and stored in the backward sections 3B and 5B of the shift registers.

Figure 1B:
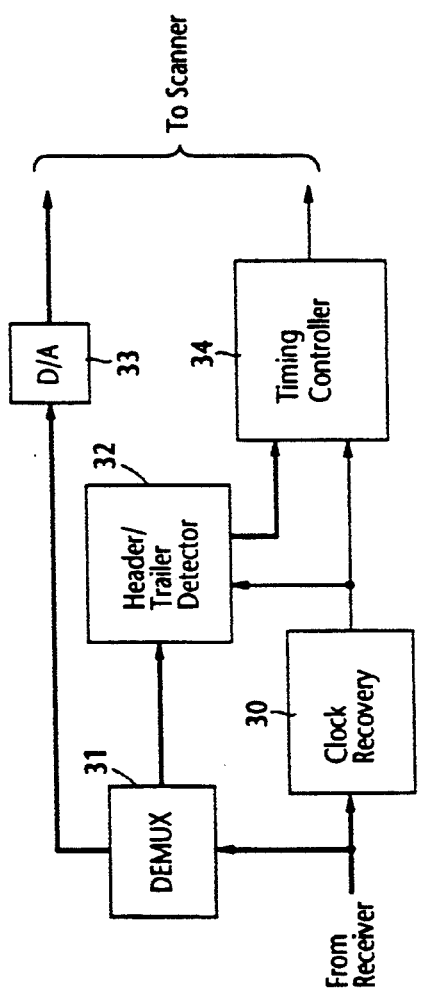
FIG. 1B is a schematic block diagram of an image reception system working to the transmission system of FIG. 1A.

In FIG. 1B, the transmitted signal is received by a demodulator of the earth station where the baseband video signal is recovered and applied to a clock recovery circuit 30 and a demultiplexer 31 where the signal is demultiplexed into a header and a trailer for coupling to a header/trailer detector 32, and a video signal for coupling to a D/A converter 33. The output of D/A converter 33 is applied to the image reproduction element of a scanner, not shown. The detected header and trailer are fed into a timing circuit 34 to produce a scanner control signal with which the scanner is driven to produce a raster image in a known manner.

Figure 2A:
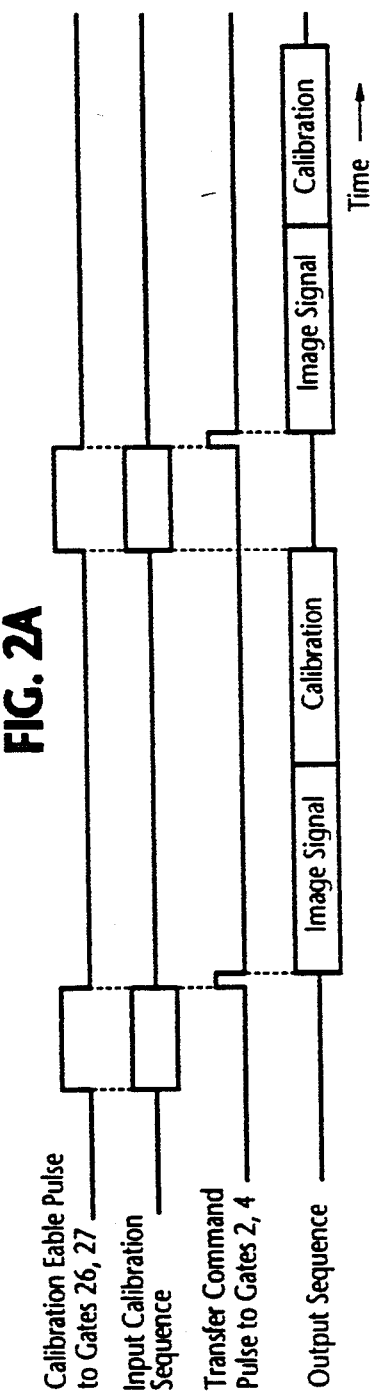
FIGS. 2A and 2B are timing diagrams useful for describing the operation of the image transmission system of FIG. 1A.
Figure 2B:
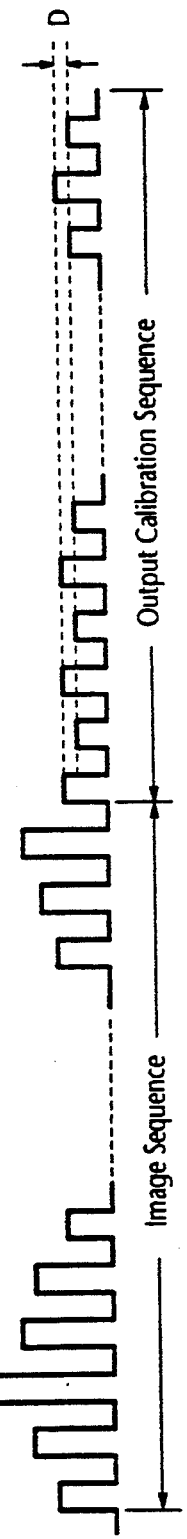

The operation of the embodiment of FIG. 1A will be described below by reference to FIGS. 2A and 2B. Calibration enable pulses are periodically supplied to gates 26 and 27 from the timing controller 23 to apply a calibration sequence of equal pulse amplitudes to the input ends of the shift registers 3, 5. In the presence of this calibration enable pulse, in shift registers 3, 5 are clocked at a high rate so that all pulses of the calibration sequence are stored in a short period of time into their backward sections 3B, 5B. A transfer command pulse is generated by the timing controller 23 immediately following each calibration enable pulse and supplied to transfer gates 2 and 4. In response to the transfer command pulse, analog image signals developed in the odd-numbered elements of CCD 1 are transferred to the shift-register forward section 3A and those developed in the even-numbered elements of the CCD are transferred to the shift-register forward section 5A. Immediately following the trailing edge of the transfer command pulse, the timing controller 23 supplies clock pulses alternately to the shift registers 3, 5 to shift the image signals as well as calibration sequences along stages to their output ends at a specified rate which is lower than the rate at which the calibration sequences have been stored. In this way, a first calibration sequence appears at the output end of shift register 3 following a sequence of odd-numbered image signals and a second calibration sequence appears at the output end of shift register 5 following a sequence of even-numbered image signals. If the shift registers 3 and 5 have different operating characteristics, the amplitudes of their calibration sequences are uniformly affected, or modulated accordingly as they are shifted along the shift register stages and assume different amplitude levels as they appear at the outputs of the shift registers, producing a amplitude difference D as shown in FIG. 2B. After amplification by amplifiers 6 and 8, the outputs of shift registers 3, 5 are applied to subtractors 7 and 9 where the amplitudes of the image signals are increased or decreased by an amount determined by the polarity and magnitude of a difference detected by the comparator 18 between odd- and even-numbered calibration sequences of a previous line scan. A multiplexed output sequence of image signals and a multiplexed output sequence of amplitude-modulated calibration pulses are supplied from multiplexer 10 to A/D converter 11 and digital versions of the video line signal and calibration sequence are generated.

The timing controller 23 enables the gate 12 to apply the digital video signal to multiplexer 14 where it is combined with a header and a trailer for transmission, and then enables the gate 13 to store the digital calibration sequence into memory 15 while at the same time causing the address generator 21 to supply a write address signal to memory 15.

During a subsequent calibration enable pulse, the timing controller 23 directs the address generator 21 to supply a read address signal to memory 15 and at the same time alternately enables the latches 16 and 17 to separately latch the odd- and even-numbered components of the amplitude-modulated calibration sequence. Digital comparator 18 makes a comparison between the amplitudes of the latched odd- and even-numbered components and generates a digital differential signal, which is converted to analog form by D/A converter 19 for coupling to one of subtractors 7 and 9 depending on the polarity of the differential signal. Since the amplitude of the original calibration sequence is known, the differential signal represents the difference between the operating characteristics of shift registers 3 and 5 and the amplitudes of the image signals from the odd- or even-numbered elements of the CCD 1 are varied to compensate for the difference in characteristics.

Figure 3A:
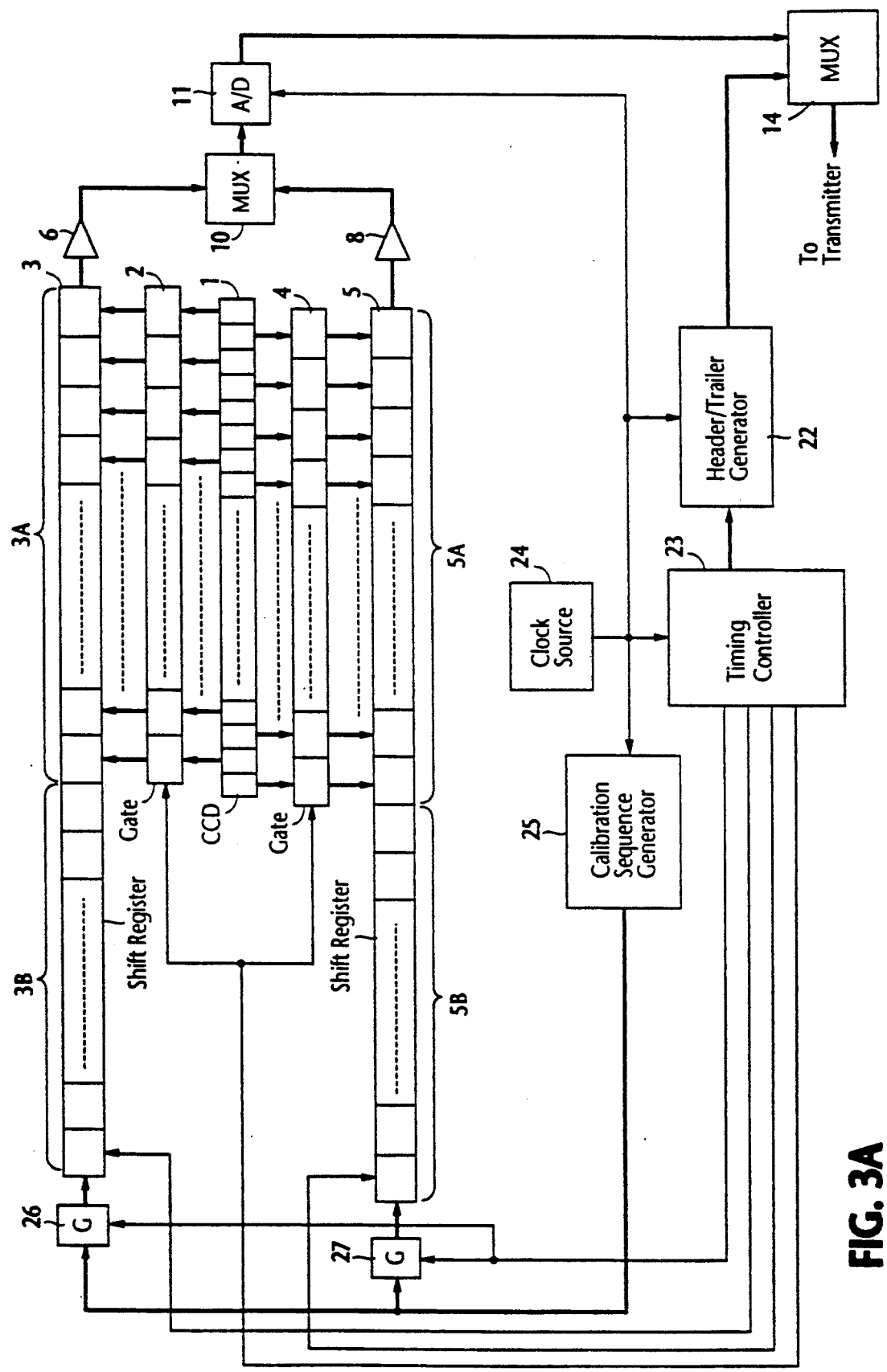
FIG. 3A is a block diagram of an image transmission system according to an alternative form of the present invention.
Figure 3B:
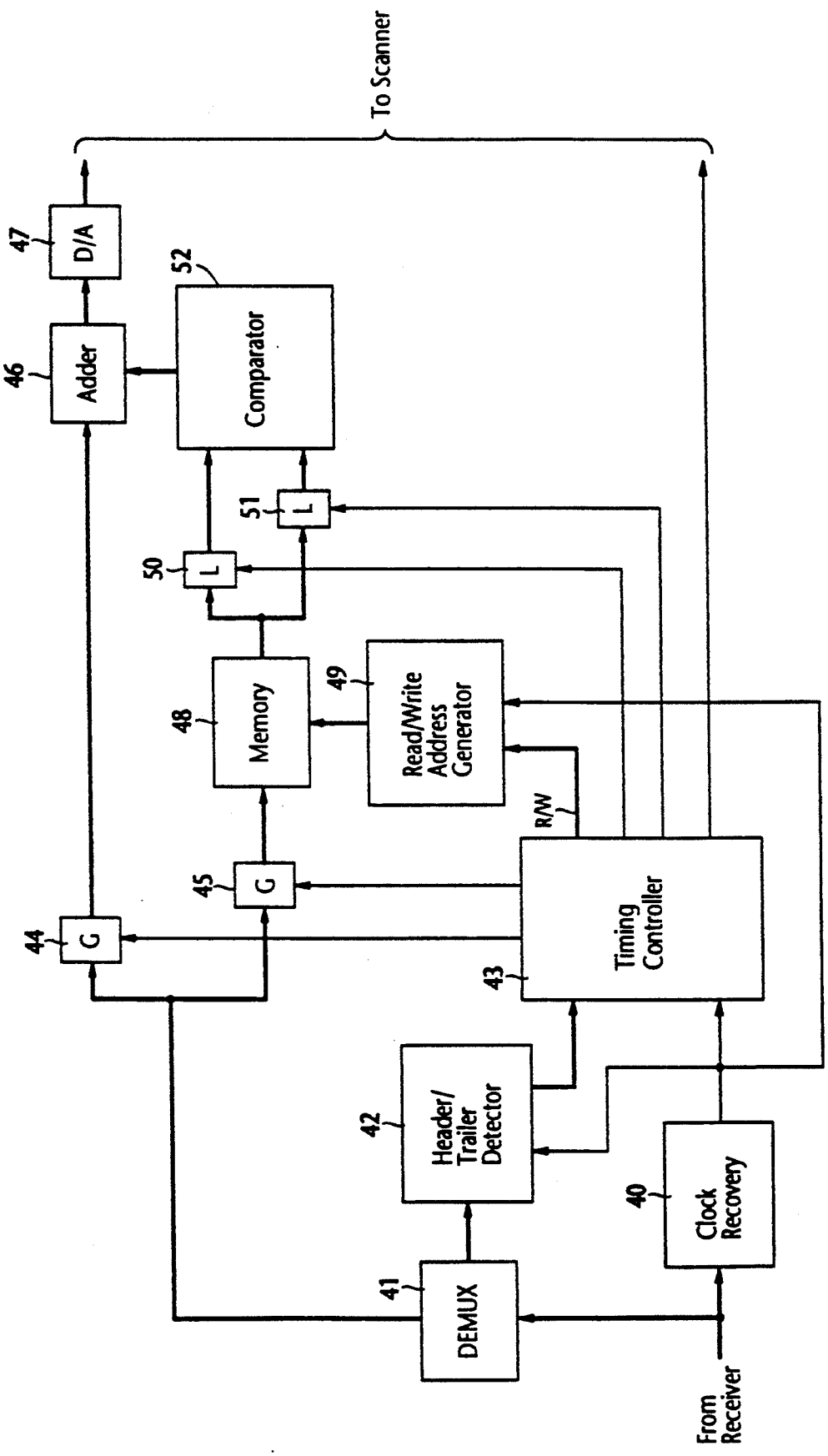
FIG. 3B is a block diagram of an image reception system working to the transmission system of FIG. 3A.

An alternative embodiment of the present invention is shown in FIGS. 3A and 3B. This embodiment differs from the previous embodiment in that the circuitry that utilizes the modulated calibration sequence for error compensation is provided in the receiving earth station in order to simplify the transmitter's circuitry. Therefore, the outputs of amplifiers 6 and 8 are directly combined by multiplexer 10 and fed to A/D converter 11, and the output of A/D converter 11, including both video and calibration sequences, is directly coupled to multiplexer 14 and multiplexed with a header and a trailer for transmission.

In FIG. 3B, on receiving a signal from the transmitter, it is demodulated by the receiving station to recover the baseband signal, which is supplied to a clock recovery circuit 40 and demultiplexer 41 where the signal is demultiplexed into a header/trailer portion for coupling to a header/trailer detector 42 and a video and calibration signal portion for coupling to gates 44 and 45. The outputs of header/trailer detector 42 and the clock recovery circuit 40 are applied to a timing controller 43 to generate various timing signals. Gate 44 is initially enabled by the timing controller to pass the digital video sequence to an adder 46 whose output is connected to a D/A converter 47. Gate 45 is subsequently enabled to pass the digital calibration sequence to a memory 48 to which a write address signal is also supplied from a read/write address generator 49. The latter derives the address signal from a read/write enable signal from timing controller 43 and a clock pulse from the clock recovery circuit 40. Latches 50 and 51 are connected to the output of memory 48, and a digital comparator 52 is provided for making a comparison between the outputs of the latches and supplies a digital differential signal to the adder 46. When the next video line sequence is arrived and passed through gate 44, the timing controller 43 applies a read enable signal to address generator 49 while alternately enabling the latches 50 and 51 to respectively latch the odd- and even-numbered calibration components. Comparator 52 detects the difference between these components and provides a digital compensation signal to adder 46 to increase or decrease the amplitude of the incoming digital video signal in accordance with the digital compensation signal. The compensated video signal is converted to analog form by D/A converter 47 and applied to a scanner, not shown.

What is claimed is:

1. An image sensing apparatus comprising:
    an array of image sensing elements;
    a first shift register having a plurality of stages divided into first and second sections, the stages of the first section corresponding respectively to odd-numbered elements of said array;
    a second shift register having a plurality of stages divided into first and second sections, the stages of the first section corresponding respectively to even-numbered elements of said array;
    gate means responsive to a transfer command pulse for transferring image signals developed in the odd-numbered elements of said array to the corresponding stages of said first shift register and transferring image signals developed in the even-numbered elements of said array to the corresponding stages of said second shift register;
    means for generating a calibration sequence of equal pulse amplitude;
    control means for generating said transfer command pulse during a line scan interval, causing said calibration sequence to be stored into the second section of each of said first and second shift registers when said gate means is in a turn-off state, and alternately driving said first and second shift registers for delivering the image signals and the calibration sequences therefrom;
    means for combining the image signals delivered from the first and second shift registers;
    means for detecting a difference in amplitude between the calibration sequences delivered from the first and second shift registers; and
    compensation means responsive to the detected difference for controlling the amplitude of the image signals delivered from said shift registers.

2. An image sensing apparatus as claimed in claim 1, wherein said calibration sequence is stored into the second section of each of said shift registers at a rate higher than a rate at which said first and second shift registers are alternately driven.

3. An image sensing apparatus as claimed in claim 1, wherein said calibration sequence is stored into the second section of each of said shift registers before the image signals are transferred to each of said first and second shift registers.

4. An image sensing apparatus as claimed in claim 1, wherein the calibration sequences are delivered from said first and second shift registers immediately following the delivery of the image signals therefrom, and wherein said compensation means controls the amplitude of the image signals which are delivered from said shift registers during a given scan interval in response to the difference detected during a scan interval immediately prior to said given scan interval.

5. An image sensing apparatus as claimed in claim 4, wherein said means for detecting a difference comprises:
    a memory for storing the calibration sequences delivered from said first and second shift registers and retrieving the stored calibration sequences from the memory; and
    comparator means coupled to said memory for deriving said difference from the retrieved calibration sequences.

6. An image sensing apparatus as claimed in claim 1, wherein the number of stages of the second section of each of said shift registers is equal to the number of stages of the first section of each of the shift registers.

* * * * *